(12) United States Patent
Sunaga et al.

(10) Patent No.: US 6,239,567 B1
(45) Date of Patent: May 29, 2001

(54) CONTROL DEVICE FOR BRUSHLESS MOTOR

(75) Inventors: Hideki Sunaga, Gunma; Futoshi Araki, Saitama; Takeshi Sekine; Eiji Takahashi, both of Tochigi, all of (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 09/379,784

(22) Filed: Aug. 24, 1999

(30) Foreign Application Priority Data

Aug. 24, 1998 (JP) .................................. 10-237650

(51) Int. Cl.[7] .................................................. H02K 23/00
(52) U.S. Cl. ........................... 318/432; 318/254; 318/268
(58) Field of Search .................................... 318/138, 254, 318/432, 439, 700, 720, 721, 722, 724, 268

(56) References Cited

U.S. PATENT DOCUMENTS

| | | |
|---|---|---|
| 4,734,628 * | 3/1988 | Bench et al. .......................... 318/432 |
| 4,893,942 | 1/1990 | Stottmann . |
| 5,161,634 | 11/1992 | Ichihara et al. . |
| 6,021,251 * | 2/2000 | Hammer et al. ..................... 318/432 |

FOREIGN PATENT DOCUMENTS

| | | |
|---|---|---|
| 0 739 085 | 10/1996 | (EP) . |
| 2 644 015 | 9/1990 | (FR) . |

* cited by examiner

*Primary Examiner*—Khanh Dang
(74) *Attorney, Agent, or Firm*—Foley & Lardner (57) ABSTRACT

A control device for a brushless motor comprises a first section which stores a data table provided to minimize a difference between an actual rotation speed of the motor and a target rotation speed of the same. The difference is inevitably produced when the motor is rotated. The data table provides a plurality of rotation speed ranges each having data for a rotation speed of the motor. The control device further comprises a second section which compares the target rotation speed and the data table to select data which corresponds to the rotation speed range to which the target rotation speed belongs. The control device further comprises a third section which corrects the target rotation speed based on the selected data and drives the brushless motor in accordance with the corrected target rotation speed.

6 Claims, 7 Drawing Sheets

CONVERSION FACTOR TABLE

| n | Dmin | Dmax | An | Bn |
|---|---|---|---|---|
| 1 | 0.0000 | 0.0625 | 2.6699 | -1.6669 |
| 2 | 0.0626 | 0.1250 | 2.4287 | -1.4287 |
| 3 | 0.1251 | 0.1875 | 2.1906 | -1.1906 |
| 4 | 0.1876 | 0.2500 | 1.9525 | -0.9525 |
| 5 | 0.2501 | 0.3125 | 1.7144 | -0.7144 |
| 6 | 0.3126 | 0.3750 | 1.4762 | -0.4762 |
| 7 | 0.3751 | 0.4375 | 1.2381 | -0.2381 |
| 8 | 0.4376 | 0.5000 | 1.0000 | 0.0000 |
| 9 | 0.5001 | 0.5625 | 0.9757 | 0.0243 |
| 10 | 0.5626 | 0.6250 | 0.9515 | 0.0485 |
| 11 | 0.6251 | 0.6875 | 0.9272 | 0.0728 |
| 12 | 0.6876 | 0.7500 | 0.9029 | 0.0971 |
| 13 | 0.7501 | 0.8125 | 0.8786 | 0.1214 |
| 14 | 0.8126 | 0.8750 | 0.8544 | 0.1456 |
| 15 | 0.8751 | 0.9375 | 0.8301 | 0.1699 |
| 16 | 0.9376 | 1.0000 | 0.8058 | 0.1942 |

FIG.5A
INVENTION

FIG.5B
KNOWN CONTROL DEVICE

CONTROL DEVICE FOR BRUSHLESS MOTOR

BACKGROUND OF THE INVENTION

1. Field of the Invention

The present invention relates to control devices for motors and more particularly to control devices for brushless motors which are applied to motor vehicles. More specifically, the present invention is concerned with a control device for accurately controlling the rotation speed of the brushless motor in accordance with an instruction signal applied thereto.

2. Description of the Prior Art

For driving blower fans of automotive air conditioners and cooling fans for radiators of motor vehicles, brushless motors have been widely used. For controlling the brushless motors, a control device including a microcomputer is usually employed.

In order to clarify the task of the present invention, one automotive air conditioner having a brushless motor controlled by a known control device will be described before making a detailed explanation of the present invention.

Figure 7:
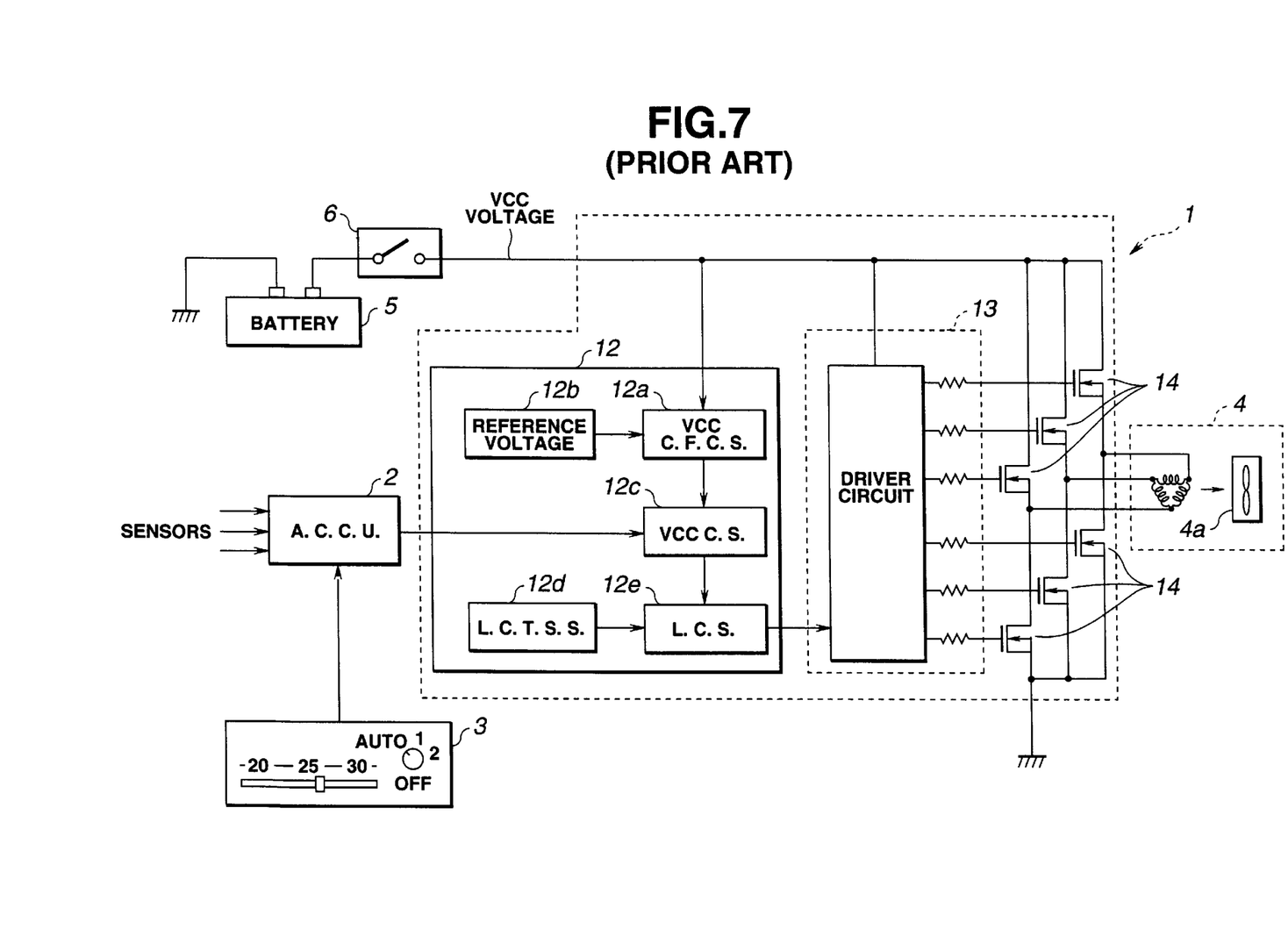
FIG. 7 is a block diagram of a known automotive air conditioner which employs a brushless motor for driving a blower fan.

FIG. 7 is a block diagram of the known automotive air conditioner which employs a brushless motor 4 for driving a blower fan 4a. Denoted by numeral 2 is an air conditioning control unit for centrally controlling the air conditioner. Denoted by numeral 3 is a control panel for permitting a driver or passenger to input instructions to the control unit 2 for setting the temperature in a vehicle cabin. In the illustrated case, the control panel 3 has a power switch and a temperature control knob. Denoted by numeral 1 is a control device for controlling the motor 4. The control device 1 comprises a processing unit 12, a drive section 13 which includes a driver circuit and resistors, and six field effect transistors (MOSFET) 14 each two being applied to one winding of the motor 4. Denoted by numeral 5 is a battery and 6 is a switch circuit for feeding when ON an electric power of the battery 5 to the motor 4. The switch circuit 6 is actuated by an ignition switch (not shown). In the following, a voltage of the electric power supplied from the battery 5 through the switch circuit 6 will be referred to as "VCC voltage".

The control panel 3 provides the air conditioning control unit 2 with an information signal representing the position of the temperature control knob, that is, a temperature desired by the passenger. In addition, information signals issued from various sensors are fed t the control unit 2, which are signals representing the temperature in the vehicle cabin, outside temperature, quantity of solar radiation and so on. Based on the information signals received, the control unit 2 issues to the processing unit 12 a voltage signal representing a desired rotation speed of the motor 4. Because the blower fan 4a is driven by the motor 4, the rotation speed of the motor 4 controls the air amount blown from an air outlet to the vehicle cabin. By means of an analogue/digital converter (A/D converter), the voltage signal from the control unit 2 is converted to a digital data and led into the processing unit 12 for calculation of a target rotation speed value of the motor 4. The target rotation speed value calculated by the processing unit 12 is a data representing a duty (which will be referred to as "input duty" (Din). The data is subjected to an after-described correction and finally becomes a pulse signal duty used for driving the motor 4. Thus, controlling of the brushless motor 4 is carried out by allowing the air conditioning control unit 2 to change the target rotation speed value (viz., input duty) led into the control device 1.

In order to allow the brushless motor 4 to run accurately at the target rotation speed, it is necessary to precisely control the rotation speed of the motor 4 in response to the input duty (Din) led into the control device 1. For dealing with a fluctuation of the VCC voltage caused by a temperature change of the battery 5, a so-called "proportional control" is used for controlling the motor 4. That is, the voltage appears at both ends of each winding of the motor 4 when each field effect transistors 14 is ON, and the voltage fluctuation tends to make a fluctuation of current in the windings. In the proportional control, the input duty (Din) is corrected based on a deviation between the sensed VCC voltage and a reference voltage. This correction will be referred to as "VCC voltage correction" hereinafter.

In the processing unit 12, the input duty (Din) is derived, and the VCC voltage is subjected to sampling to obtain VCC voltage value "Vi". And, in a VCC correction factor calculating section 12a of the processing unit 12, a VCC correction factor "Ma" is calculated by using the following equation (1).

$$\text{VCC correction factor "Ma"} = Vt/Vi \tag{1}$$

wherein:
  Vt: reference VCC voltage (=12.5V) stored in a reference voltage generating section 12b.

The VCC correction factor "Ma" is led into a VCC correction section 12c of the processing unit 12, and by using the following equation (2), a VCC voltage correction is carried out in the section 12c to obtain a medium duty (Dm).

$$\text{medium duty} = \text{input duty (Din)} \times Ma \tag{2}$$

After correcting the VCC voltage, a linearity correction is carried out to cause the rotation speed of the motor 4 to have a linearity to the medium duty (Dm). That is, when the medium duty (Dm) is led into a linearity correcting section 12e of the processing unit 12, a linearity correction factor "Mc" corresponding to the medium duty (Dm) is looked up from a linearity correction table 12d, and by using the following equation (3), an output duty (Dout) of pulse signal directed to the drive section 13 is calculated.

$$\text{output duty (Dout)} = Dm \times Mc \tag{3}$$

Upon receiving the pulse signal with the output duty through the drive section 13, the six field effect transistors 14 are turned ON in given order thereby to feed the windings of the motor 4 to drive the same. Accordingly, in the processing unit 12, the voltage signal of the target rotation speed value for the motor 4 is processed for controlling the rotation speed of the motor 4. With this, the rotation speed of the brushless motor 4, that is, the amount of air blown from the air outlet is controlled to a target amount for contributing to the air conditioning in the vehicle cabin.

As is described hereinabove, in the known control device for the brushless motor employed in the automotive air conditioner, in order to drive the brushless motor 4 at a target rotation speed, both a proportional control based on the deviation of the power voltage and a correction for improving the linearity of the rotation speed of the motor 4 are practically carried out.

Recently, with increased demand for amenity in the vehicle cabin, it has become necessary to control the temperature in the vehicle cabin with a much higher accuracy and thus, the control for the brushless motor of a blower fan has needed a higher accuracy.

However, the known control device fails to provide the brushless motor 4 with finely controlled rotation due to a mechanical energy loss of the motor 4 and a ripple on the source voltage of the motor 4. In fact, the dispersion is inevitably produced in accordance with the rotation speed of the motor 4. For solving the drawback, various measures have been proposed. However, almost all have failed to exhibit a satisfied result.

SUMMARY OF THE INVENTION

It is therefore an object of the present invention to provide a control device which can accurately control the rotation speed of a brushless motor throughout a widened speed range.

It is another object of the present invention to provide an improved control device for controlling a brushless motor which serves to drive a blower fan of an automotive air conditioner, a radiator cooling fan of a motor vehicle, and the like.

According to a first aspect of the present invention, there is provided a control device for a brushless motor, which comprises a first section which stores a data table provided to minimize a difference between an actual rotation speed of the motor and a target rotation speed of the same, the difference being inevitably produced when the motor is rotated, the data table providing a plurality of rotation speed ranges each having data for a rotation speed; a second section which compares the target rotation speed and the data table to select data which corresponds to the rotation speed range to which the target rotation speed belongs; and a third section which corrects the target rotation speed based on the selected data and drives the brushless motor in accordance with the corrected target rotation speed.

According to a second aspect of the present invention, there is provided a control device for controlling rotation speed of a brushless motor employed in a motor vehicle. The control device comprises first means for deriving a VCC correction factor based on a VCC voltage and a reference voltage, the VCC voltage being a voltage of electric power supplied from a battery mounted on the vehicle; second means for picking up an identification data from a table with reference to an input duty issued from an air conditioning control unit; third means for selecting primary and secondary conversion factors with reference to the picked up identification data; fourth means for calculating a duty correction factor from the VCC correction factor and the selected primary and secondary conversion factors; fifth means for calculating a medium duty from the input duty and the duty correction factor; sixth means for looking up a linearity correcting factor from a linearity correction table, with reference to the medium duty; and seventh means for calculating an output duty from the medium duty and the VCC correction factor, the output duty being used for producing a pulse signal to drive the brushless motor.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Referring to FIGS. 1 to 6, there is shown a control device for controlling a brushless motor, which is an embodiment of the present invention.

Figure 1:
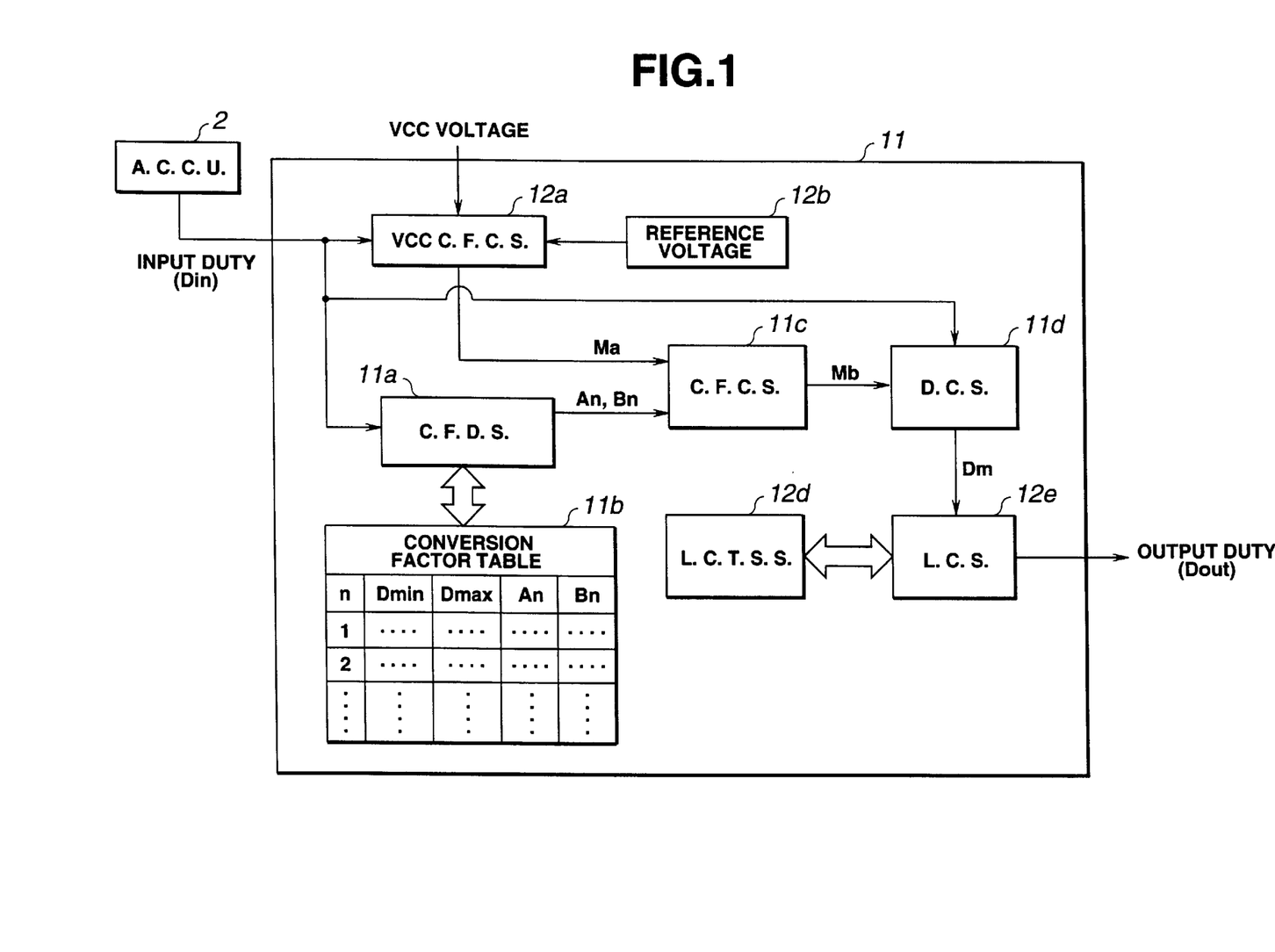
FIG. 1 is a functional block diagram of a control device for a brushless motor, which is an embodiment of the present invention.

FIG. 1 shows a functional block diagram of a processing unit 11 employed in the invention. It is to be noted that this processing unit 11 is practically applied to the automotive air conditioner of FIG. 7 substituting for the above-mentioned known processing unit 12.

Similar to the above-mentioned processing unit 12, the processing unit 11 employed in the present invention comprises a reference voltage generating section 12b, a VCC correction factor calculating section 12a, a section 12d for storing a linearity correction table and a linearity correcting section 12e.

In addition, the processing unit 11 further comprises a conversion factor deriving section 11a which selects a conversion factor used for converting the VCC. correction factor "Ma" based on the input duty "Din", a section 11b which stores the data for the conversion factor, a correction factor converting section 11c which converts the VCC correction factor "Ma" based on the conversion factor selected, and a duty correcting section 11d which, based on the input duty (Din), derives the medium duty (Dm) directed to the linearity correcting section 12e.

In the following, operation will be described.

In the present invention, similar to the above-mentioned known control device, a proportional control is carried out based on the fluctuation of the VCC voltage value "Vi". That is, in the processing unit 11, the VCC voltage value "Vi" is subjected to analogue/digital conversion and then sampling, and then in the VCC correction factor calculating section 12a, calculation of VCC correction factor "Ma" is carried out based on the reference voltage 12b and the VCC voltage value "Vi".

At the same time, from a voltage signal issued from the air conditioning control unit 2, there is derived an input duty "Din" which represents a target rotation speed value of the brushless motor 4. The input duty "Din" thus derived is subjected to after-mentioned processes to become a duty value of a pulse signal for driving the motor 4.

Figure 2:
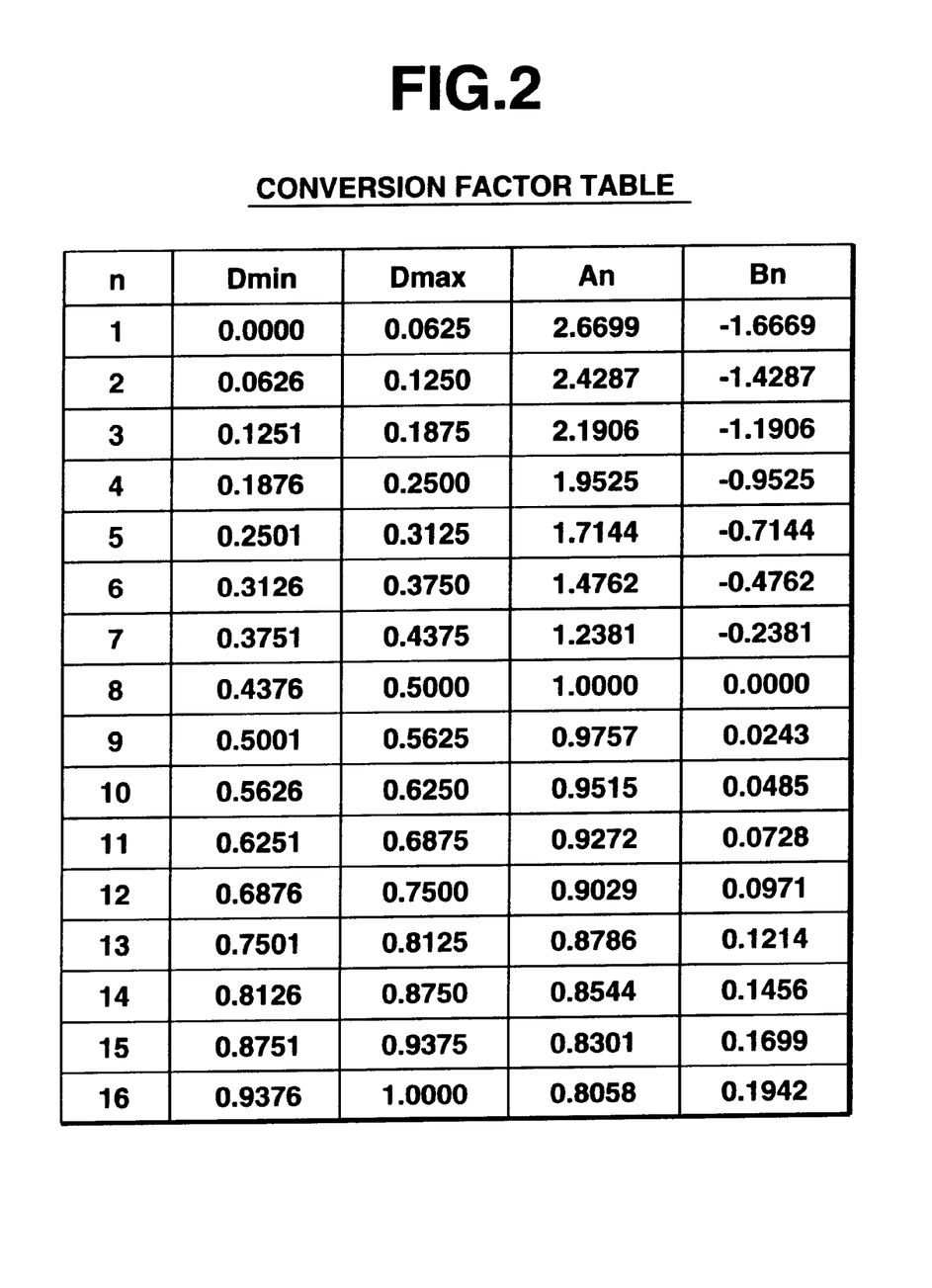
FIG. 2 is a table showing conversion factors used in the control device of the invention.

In the present invention, the input duty "Din" is led into the conversion factor selecting section 11a. In this section 11a, based on the input duty "Din", a conversion factor needed for converting the VCC correction factor "Ma" is picked up from the conversion factor storing section 11b. The conversion factor storing section 11b stores such a table as shown in FIG. 2. In fact, such table is stored in ROM (read only memory) of the processing unit 11. In the table, "n" denotes an identification data "ID", and "Dmin" and "Dmax" represent the minimum and maximum duty values of each range of the input duty "Din". Denoted by "An" is a primary conversion factor which is multiplied to the VCC correction factor "Ma", and denoted by "Bn" is a secondary conversion factor which is added to the multiplied result. It is to be noted that these primary and secondary factors "An" and "Bn" have been so determined that the actual rotation speed can finally approach a rotation speed characteristic which would be exhibited when the VCC voltage is 12.5V. For this determination, correction of duty is repeatedly carried out by repeatedly rotating the motor 4.

In the conversion factor selecting section 11a, a judgment is carried out as to which range of the conversion factors of the table of FIG. 2, the input duty "Din" is included with reference to the "Dmin" and "Dmax", and based on the result, the identification data "ID" corresponding to the range is determined. Upon determination of the ID, the primary and secondary conversion factors "An" and "Bn" corresponding to the ID are selected and fed to the correction factor converting section 11c. In the section 11c, the VCC correction factor "Ma" is converted to a duty correction factor "Mb" by using the following equation (4):

$$\text{duty correction factor "Mb"}=Ma\times An+Bn \tag{4}$$

That is, when the duty correction factor "Mb" is represented as a linear function of the VCC correction factor "Ma", the primary and secondary conversion factors "An" and "Bn" represent gradient and intercept components respectively.

Figure 3:
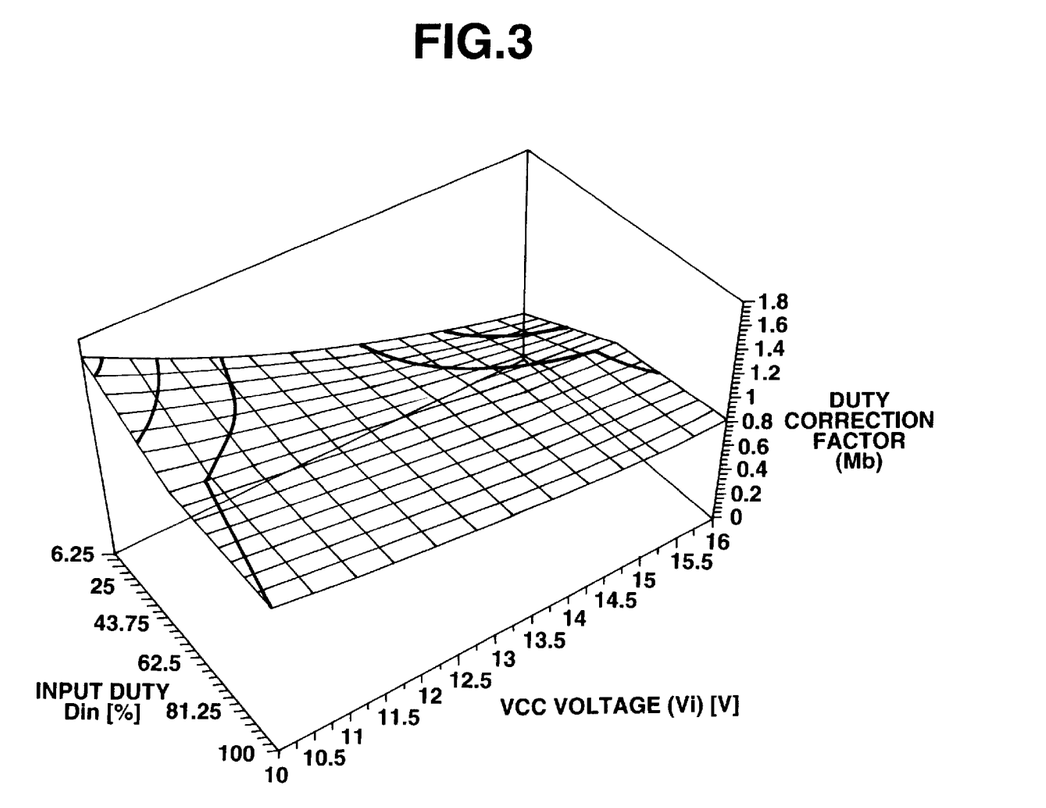
FIG. 3 is a map showing a duty correction factor "Mb" in view of an input duty "Din" and a VCC voltage value "Vi"

FIG. 3 is a three dimensional map showing a relationship between the duty correction factor "Mb", the input duty "Din" and the VCC voltage value "Vi". That is, this map shows various duty correction factors "Mb" with the input duty "Din" and the VCC voltage value "Vi" being variables.

In the duty correcting section 11d, the duty correction factor "Mb" and the input duty "Din" are multiplied together to derive a medium duty "Dm" by using the following equation (5):

$$\text{medium duty "Mb"}=Din\times Mb \tag{5}$$

Figure 4:
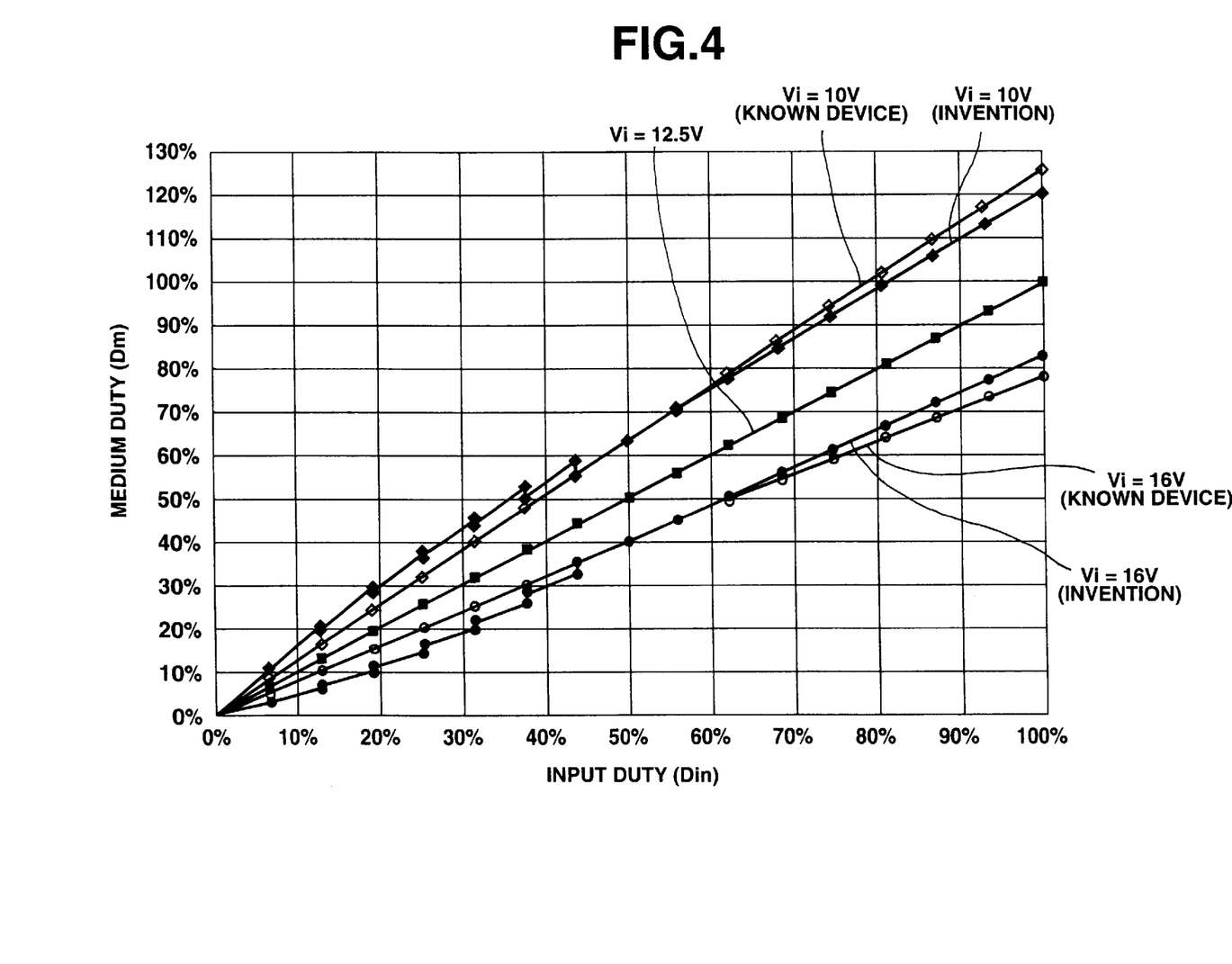
FIG. 4 is a graph showing a relationship between a medium duty and the input duty "Din" in various values of the VCC voltage "Vi"

FIG. 4 is a graph showing a relationship between the input duty "Din" and the medium duty "Dm" in various values (viz., 10V, 12.5V and 16V) of the VCC voltage "Vi". For comparison, the relationship in case of the known control device is also shown. It is to be noted that when the VCC voltage "Vi" is 12.5V, the present invention and the known control device show the same relationship.

As is seen from this graph, in both the present invention and the known control device, due to function of the proportional control, when the VCC voltage "Vi" is relatively high, that is, 16V, the input duty "Vi" is so corrected as to decrease the medium duty "Dm", while, when the VCC voltage "Vi" is relatively low, that is, 10V, the input duty "Vi" is so corrected as to increase the medium duty "Dm".

In the present invention, however, the primary and secondary conversion factors "An" and "Bn" are used for converting the VCC correction factor "Ma" for each range (see FIG. 2). Thus, in both a higher speed range of the "Vi" being 16V and a lower speed range of the "Vi" being 10V, the medium duty "Dm" is somewhat increased as compared with that of the known control device, and in both a high speed range of the "Vi" being 10V and a lower speed range, of the "Vi" being 16V, the medium duty "Dm" is somewhat decreased as compared with that of the known control device.

That is, in the present invention, throughout the rotation speed of the brushless motor 4, the duty for indicating the target rotation speed of the motor 4 can be finely converted.

Upon the medium duty "Dm" being derived in the above-mentioned manner, a linearity correction is carried out in the linearity correcting section 12e. That is, the medium duty "Dm" is led into the section 12e, and a linearity correcting factor "Mc" corresponding to the medium duty "Dm" is looked up from the linearity correction table storing section 12d. Then, by using the following equation (6), output duty "Dout" is derived.

$$\text{output duty "Dout"}=Dm\times Mc \tag{6}$$

From the linearity correcting section 12e, there is issued a pulse signal of the output duty "Dout" for driving the brushless motor 4 through the drive section 13 (see FIG. 7).

As is described hereinabove, in the present invention, the series of operations from the sampling of the voltage signal (which represents a target rotation speed of the motor 4) from the air conditioning control unit 2 to the actual driving of the motor 4 is continuously carried out by after another. Thus, the rotation speed of the brushless motor 4 can be finely controlled throughout a widened speed range.

In the present invention, the primary and secondary conversion factors "An" and "Bn" of the conversion factor storing section 11b are previously stored as data for minimizing an inevitable difference between the target rotation speed of the motor 4 and the actual rotation speed of the same. Accordingly, in the present invention, there is no need of thinking out a measure for removing or at least minimizing an inevitable dispersion of the actual rotation speed of the motor 4, which would be caused by a mechanical energy loss of the motor 4 and a ripple on the source voltage. This induces improved control of the brushless motor 4 and thus induces improved control for the air amount blown from an air outlet to the vehicle cabin.

Since the present invention practically uses the conversion factor table which has two zones provided for the primary and secondary conversion factors "An" and "Bn", combination of them is easily achieved and thus an appropriate conversion factor is easily derived.

In the present invention, the entire range of the input duty "Din" of the conversion factor table is evenly divided. Thus, In the following, advantageous effect possessed by the present invention will be described with reference to FIG. 5A. For ease of understanding, FIG. 5B is also presented which shows an effect possessed by the known control device of FIG. 7.

Figure 5A:
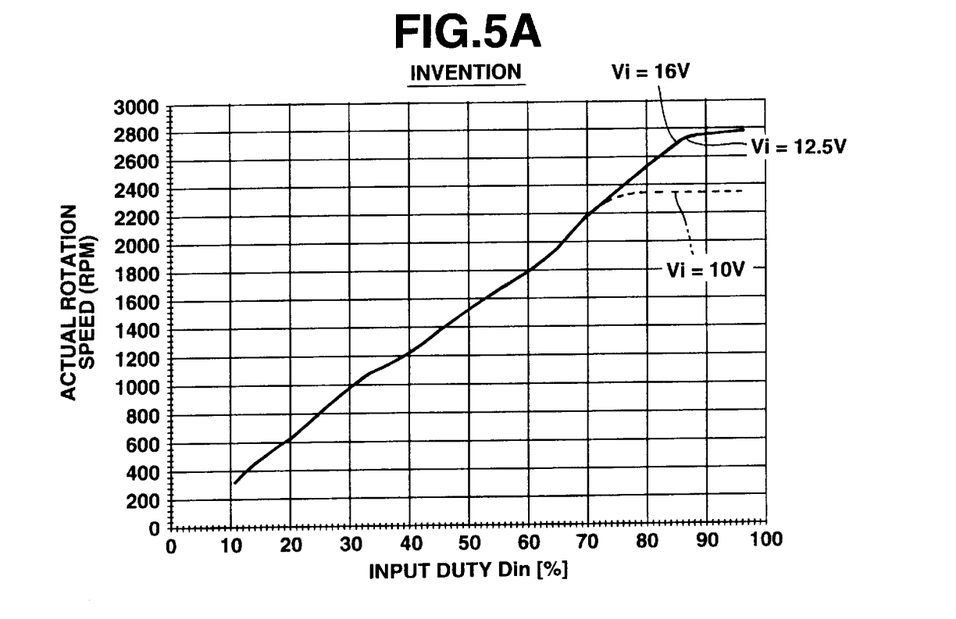
FIG. 5A is a graph depicting an advantageous characteristic of the present invention in terms of a relationship between the input duty "Din" and an actual rotation speed of brushless motor.
Figure 5B:
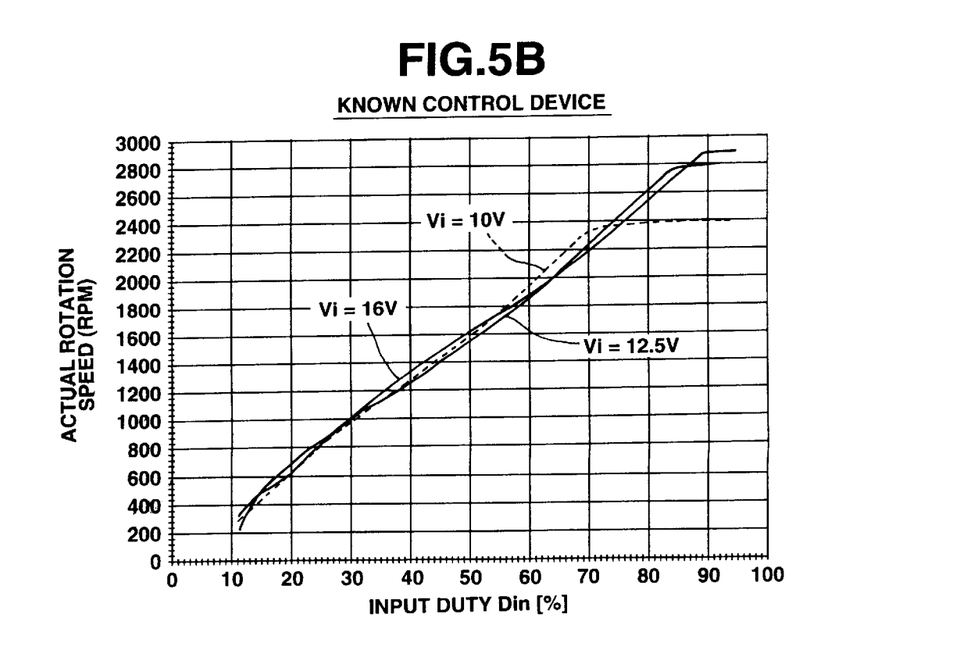
FIG. 5B is a graph similar to FIG. 5A, but depicting a characteristic of the known control device.

As is seen from FIG. 5B, in the known control device, the actual rotation speed of the brushless motor does not finely correspond to the input duty "Din". This is because of an inevitable ripple on the VCC voltage "Vi".

While, as is seen from FIG. 5A, in the present invention, the actual rotation speed of the brushless motor corresponds accurately to the input duty "Din", especially within a certain range from the input duty of 10% to that of 70%. That is, even when the VCC voltage "Vi" varies in the range between 10V, 12.5V and 16V, the actual rotation speed of the motor 4 does not show dispersion in the certain range. That is, in accordance with the present invention, the actual rotation speed of the brushless motor 4 can finely correspond to the input duty "Din" which represents the target rotation speed of the motor 4.

It is to be noted that the conversion factors "An" and "Bn" of each range of the table of FIG. 2 are so determined that when the VCC correction factor "Ma" is 1 (one), that is, when the VCC voltage "Vi" is equal to the reference voltage "Vt", the duty correction factor "Mb" is 1 (one). That is, 12.5V is used as a reference voltage for the VCC voltage, and the conversion factors "An" and "Bn" are so determined as to match the rotation speed characteristic possessed by the VCC voltage. Accordingly, as is seen from FIG. 5A, even if the VCC voltage "Vi" varies, a rotation speed set when the VCC voltage "Vi" is equal to the reference voltage "Vt" is finally obtained. Accordingly, in the air conditioning control unit 2, based on the characteristic set when the reference voltage "Vt" is 12.5V, it is only necessary to derive an input duty "Din" which represents the target rotation speed of the motor 4.

Figure 6:
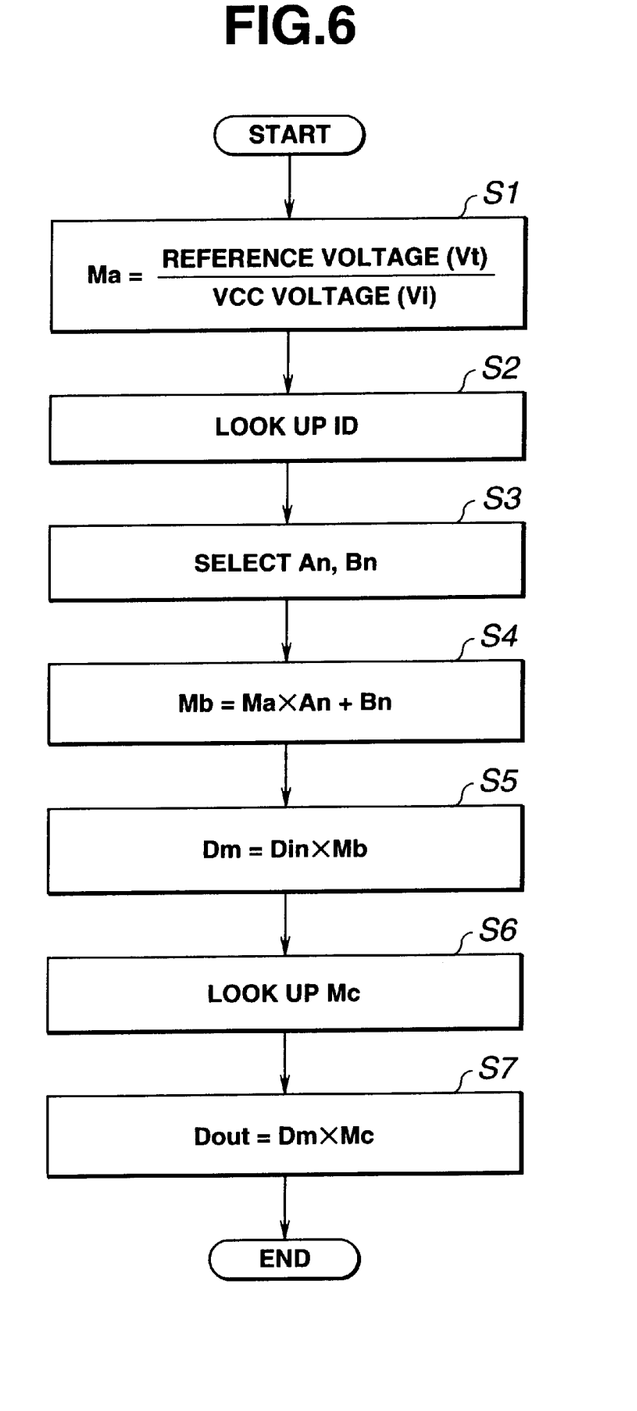
FIG. 6 is a flowchart showing programmed operation steps executed in a computer used in the present invention.

In the following, programmed operation steps executed in the processing unit 11 will be described with reference to the flowchart shown in FIG. 6.

First, at step Si, based on the VCC voltage "Vi" and the reference voltage "Vt", the VCC correction factor "Ma" is derived.

Then, at step S2, based on the input duty "Din" issued from the air conditioning control unit 2, the identification data "ID" is picked up from the table (see FIG. 2) stored in the conversion factor storing section 11b.

At step S3, based on the identification data "ID" thus picked up, the primary and secondary conversion factors "An" and "Bn" are selected.

At step S4, from the "Ma", "An" and "Bn", the duty correction factor "Mb" is calculated by using the equation (4).

At step S5, from "Din" and "Mb", the medium duty "Mb" is calculated by using the equation (5).

At step S6, from the linearity correction table in the section 12d, the linearity correcting factor "Mc" corresponding to the medium duty "Dm" is looked up.

Then at step S7, from "Dm" and "Mc", the output duty "Dout" is calculated by using the equation (6).

Based on the output duty "Dout" thus provided, a pulse signal is produced for driving the brushless motor 4 through the drive section 13.

It is to be noted that in the processing unit 14, the VCC correction factor calculating section 12a, the conversion factor deriving section 11a, the correction factor converting section 11c, the duty correcting section 11d and the linearity correcting section 12e are provided by a software executed by a corresponding computer. The reference voltage in the section 12b, the conversion factor table in the section 11b and the linearity correction table in the section 12d are stored in ROM (viz., read only memory) of the computer. With this arrangement, the number of logic circuits of the computer is reduced thereby to allow the motor 4 to have a simple wiring and thus a satisfied heat radiation.

When a brushless motor controlled by the control device is applied to a radiator cooling fan of an automotive engine, the cooling effect of the fan can be accurately controlled.

As is described hereinabove, in the control device of the present invention, a target rotation speed of the brushless motor is corrected by practically using a conversion factor data which is provided to minimize an inevitable difference between the target rotation speed of the brushless motor and the actual rotation speed of the same. Thus, in the present invention, an inevitable dispersion of the actual rotation speed of the brushless motor, which would be caused by a mechanical energy loss of the motor and a ripple on a source voltage, is minimized, so that the actual rotation speed of the motor is finely and actually controlled in a widened rotation speed range.

The entire contents of Japanese Patent Application P10-237650 (filed Aug. 24, 1998) are incorporated herein by reference.

Although the invention has been described above with reference to an embodiment of the invention, the invention is not limited to the embodiment described above. Various modifications and variations of the embodiment described above will occur to those skilled in the art, in light of the above teachings.

What is claimed is:

1. A control device for controlling rotation speed of brushless motor employed in a motor vehicle, comprising:

first means for deriving a voltage correction factor based on a source voltage and a reference voltage, said source voltage being a voltage of electric power supplied from a battery mounted on the vehicle;

second means for picking up an identification data from a table with reference to an input duty issued from an air conditioning control unit;

third means for selecting primary and secondary conversation factors with reference to the picked up identification data;

fourth means for calculating a duty correction factor from said voltage correction factor said selected primary and secondary conversion factor;

fifth means for calculating a medium duty from said input duty and said duty correction factor;

sixth means for looking up a linearity correcting factor from a linearity correction table, with reference to said medium duty; and seventh means for calculating an output duty from said medium duty and said voltage correction factor, said output duty being used for producing a pulse signal to drive the brushless motor.

2. A control device as claimed in claim 1, in which said first means drives the voltage correction factor by dividing the reference voltage by said source voltage.

3. A control device as claimed in claim 2, in which said fourth means calculates said duty correction factor by using the following equation:

$$Mb = Ma \times An + Bn$$

wherein:
Mb: duty correction factor
Ma: voltage correction factor
An: primary conversion factor
Bn: secondary conversion factor.

4. A control device as claimed in claim 3, in which said fifth means calculates the medium duty by using the following equation:

$$Dm = Din \times Mb$$

wherein:
Dm: medium duty
Din: input duty
Mb: duty correction factor.

5. A control device as claimed in claim 4, in which said seventh means calculates the output duty by using the following equation:

$$Dout = Dm \times Mc$$

wherein:
Dout: output duty
Dm: medium duty
Mc: linearity correcting factor.

6. A control device for controlling rotation speed of brushless motor employed in a motor vehicle, comprising:

a first section which derives a voltage correction factor based on a source voltage and a reference voltage, said source voltage being a voltage of electric power supplied from a battery mounted on the vehicle;

a second section which picks up an identification data from a table with reference to an input duty issued from an air conditioning control unit;

a third section which selects primary and secondary conversation factors with reference to the picked up identification data;

a fourth section for calculating a duty correction factor from said voltage correction factor said selected primary and secondary conversion factor;

a fifth section which calculates a medium duty from said input duty and said duty correction factor;

a sixth section which looks up a linearity correcting factor from a linearity correction table, with reference to said medium duty; and a seventh section which calculates an output duty from said medium duty and said voltage correction factor, said output duty being used for producing a pulse signal to drive the brushless motor.

* * * * *